Aug. 23, 1966     C. F. CALA     3,268,213
APPARATUS FOR HOMOGENIZING GLASS
Filed June 8, 1964
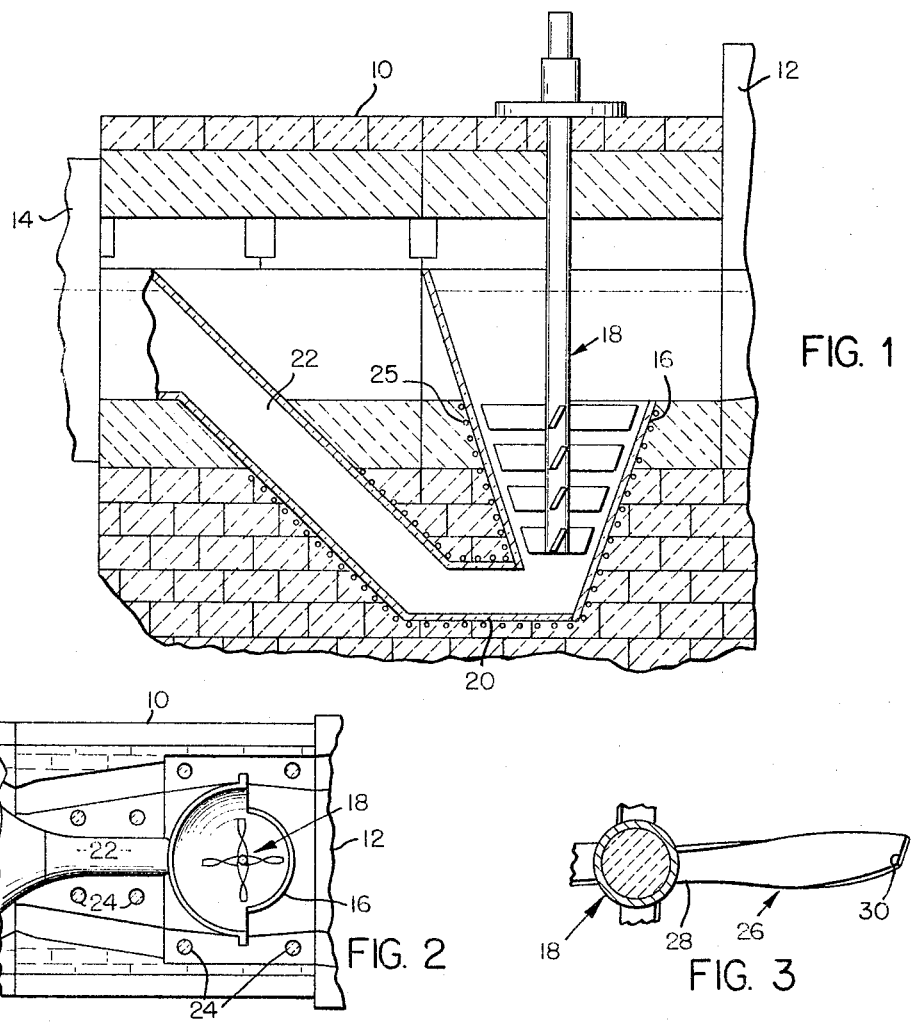
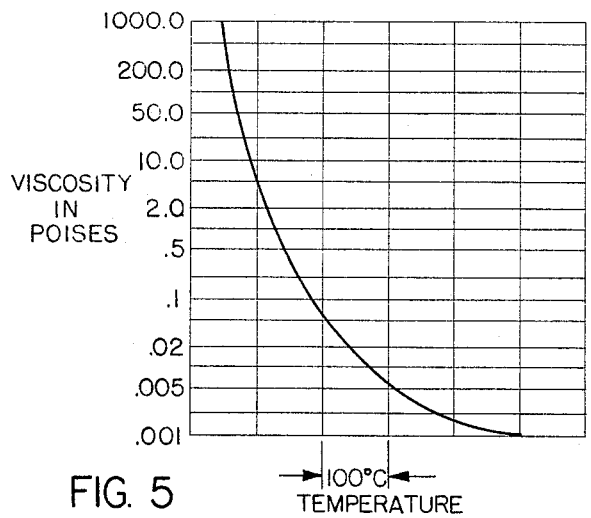
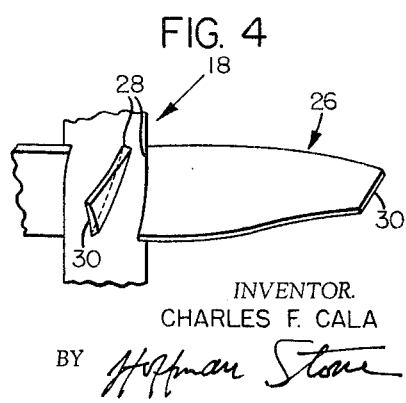
INVENTOR.
CHARLES F. CALA
BY *Hoffman Stone*
ATTORNEY

United States Patent Office 3,268,213
Patented August 23, 1966

3,268,213
APPARATUS FOR HOMOGENIZING GLASS
Charles F. Cala, 144 Hoover Road, Rochester, N.Y.
Filed June 8, 1964, Ser. No. 373,300
10 Claims. (Cl. 259—7)

This invention relates to apparatus for stirring molten glass thereby to improve its uniformity and to reduce discontinuities such as striae in it, and more particularly, but not exclusively, to novel apparatus of this type which is especially well adapted for installation in standard industrial glass-making machinery.

It has long been known that stirring can markedly improve the quality of glass, especially when done when the glass is in a relatively viscous state just before it is cast. With the recent emphasis on reduction of weight and wall thicknesses of many mass produced glass products such as, for example, non-returnable beverage bottles, improvement in the quality of the glass is becoming increasingly important. Striae, cords, and other imperfections constitute localized weaknesses in the glass products, rendering them unmerchantable. Reduction of striae and other imperfections permits the achievement of lighter weight glass products because it enables a reduction in wall thickness without loss of strength relative to similar products in which account must be taken of considerable localized weakening due to the presence of cords and striae.

Thus, even for products which, heretofore, have been made of glass of relatively poor quality, there is a growing demand for glass of relatively high quality, of a quality even approaching that ordinarily required in the manufacture of optical ware.

Although the practice of the present invention is expected to have relatively wide application, its immediate utilization on a practical commercial scale is thought to have its greatest potential in connection with the standard type of industrial equipment on which substantially all of the mass produced glassware in the United States is made. The standard equipment includes a melting furnace where the initial batch ingredients of the glass are melted and heated to a relatively high temperature to form a glass of relatively low viscosity, a forehearth where the glass discharged from the melting furnace is cooled to make it more viscous, and a discharge bowl, or spout which receives the glass from the forehearth and discharges it through a nozzle in the form of gobs. The apparatus of the present invention is especially suitable for substitution in place of the final section of the standard forehearth for stirring the glass just before it is delivered to the spout and while it is at the optimum viscosity for stirring.

The standard forehearth comprises, in the order of flow of the glass from the melting furnace to the spout, first, a cooling section, and then a conditioning, or equalizing section. Both heating fires and cooling wind are provided in the cooling section, and heating fire is provided in the conditioning section, but bascially the design is intended to accomplish substantially all of the cooling in the cooling section, and to render the temperature of the entire body of flowing glass uniform throughout its thickness and width in the conditioning section. Heretofore, some stirring has been done at the entrance of the conditioning section by placing rotating paddles or turbines in the molten stream of glass at that point. Such stirring as heretofore carried out has been effective to improve the uniformity of temperature of the molten stream of glass and to reduce thermal gradients in it, but has been relatively ineffective for reducing the amount of striae and cords in the glass and for physically homogenizing it.

Gobbing of optical glass is well known, but special machinery has been required, and it is not economically practical to replace the presently installed glass gobbing machinery used for making mass production items such as bottles and the like with machinery of the type used for ophthalmic and optical glass. It would be prohibitively expensive to switch from conventional utility gobbers to entirely new equipment.

Accordingly, one important object of the present invention is to provide novel apparatus for stirring glass. Other objects are: to provide novel glass stirring apparatus which may be readily installed in current commercial glass making equipment at relatively small expense to produce glass of relatively high uniformity and freedom from cords and striae; to provide novel glass stirring apparatus which successfully overcomes certain disadvantages of previous stirring apparatus and which enables the production of glass of relatively high uniformity and homogeneity.

The foregoing and other objects and advantages of the invention will become apparent from the following detailed description of a presently preferred embodiment thereof, taken in conjunction with the drawing, wherein:

FIG. 1 is a longitudinal, sectional view of glass stirring apparatus of the invention, showing the apparatus installed in the equalizing, or conditioning section of a standard forehearth;

FIG. 2 is a plan view, partly in schematic form, of the apparatus and forehearth shown in FIG. 1 but with the cover removed;

FIG. 3 is a horizontal, sectional view of the stirrer shaft, showing in plan one of the paddle blades of the stirrer;

FIG. 4 is a fragmentary, side elevational view of the stirrer shaft showing the paddle blades thereon; and FIG. 5 is a chart showing the variation in viscosity as a function of temperature of a typical glass composition.

Briefly, one feature of the invention contemplates the provision of a downwardly tapered stirring vessel arranged so that the glass flows vertically through the vessel while it is being stirred, whereby certain thermal effects are overcome and the efficiency and effectiveness of stirring are improved.

A second feature of the invention relates to the shape of the blades of the stirring paddle, or turbine. The blades are shaped not only to exert an upward force on the flowing mass of glass, but also to compensate for the differentials between the linear velocities of the successive different portions of the blades, thereby to produce a more nearly uniform force across the entire horizontal section of the glass than is possible with previously proposed stirrers.

Glass presents a difficult stirring problem because of its great tendency to striate due to batch segregation, to pick up impurities from tank linings, and to vary its composition from region to region within its mass due to surface volitilization and to variations in temperature. Normally, glass is initially heated to a relative high temperature at which its viscosity is low, like a thin syrup. In this state, mixing is relatively easy and simple, but striae, cords, and other imperfections then develop upon cooling to the relatively high, thick, molasses-like viscosity required for gobbing or casting. To achieve optimum results, glass must be stirred at a temperature as close as possible to its gobbing or casting temperature, at which temperature its viscosity is relatively high. Moreover, for optimum results, each and every portion of the glass should be stirred as much as every other portion. No part of the glass should be allowed to pass through the stirring vessel without being stirred as much as every other part.

It has now been found that there are two effects, which have not heretofore been taken into account in the design of glass stirring apparatus, and which limit the effectiveness of previous stirring apparatus. The first effect relates to the tendency of the glass to be thinner, and therefore to flow more rapidly along the walls of the stirring vessel.

It is difficult to hold the entire contents of the stirring vessel at a uniform temperature. In practice, heat must be applied, usually from outside of the vessel, and a layer of glass along the outer wall of the stirring chamber becomes thinner, and runs downwardly relative to the major portion of the glass, which is spaced inwardly from the outer wall of the vessel. The effect is not a minor matter, because even a relatively slight temperature change produces a very large change in viscosity in the temperature ranges at which glass is cast. This may be seen by an inspection of FIG. 5, which shows a typical viscosity curve for glass.

According to the invention, the effect is effectively neutralized by the conical shape of the stirring vessel. The paddles, or stirring blades produce a centrifugal action in the glass, throwing it radially outwardly against the tapered wall of the conical vessel. In a cylindrical vessel the centrifuged glass impinges upon the wall and is deflected equally upwardly and downwardly. In the tapered vessel of the invention, the inclination of the wall deflects the glass generally upwardly in a sufficient degree to overcome and compensate for the normal tendency of the glass to flow downwardly along the outer wall of the vessel more rapidly than in the interior. The compensation may be nicely adjusted by varying the speed of stirring.

The second effect with which the present invention is concerned relates to the tendency of the glass also to flow more rapidly down along the central shaft upon which the paddle or turbine blades are mounted. This effect comes about by reason of the relatively slow linear velocities of the paddle blades near their roots relative to the velocities of the blades at their tips. There is, therefore, less stirring action at the roots of the paddle blades than at their tips, and less impediment to the downward flow of the central column of glass adjacent to the shaft. According to the invention, the paddle blades are shaped to compensate for this effect and thereby to produce a more uniform stirring action throughout the mass of glass than achievable with previously known paddle blades.

Referring now to the drawing, FIGS. 1 and 2 show stirring apparatus of the present invention installed in the equalizing, or conditioning section of a standard forehearth of the type now in general use in the vast majority of glass making plants in this country. As shown, the flow is from right to left, with the glass entering from the cooling section 12 of the forehearth, traveling through the stirring apparatus in the equalizing section 10, and being delivered to the spout 14 for gobbing. The stirring vessel 16 is of conical shape, tapered downwardly, with its major axis vertical. It is preferably lined with platinum or other glass-insoluble refractory metal. The glass flows in at the upper end of the vessel 16, and thence downwardly through the vessel, where it is stirred by a paddle stirrer 18. The glass then flows out at the bottom of the vessel into a horizontal duct 20, thence through an upwardly inclined duct 22 to the spout 14.

In operation, due to the centrifugal action of the stirrer 18 on the glass, the outer walls of the conical vessel 16 direct the glass upwardly therealong and effectively counteract the normal tendency of the glass to flow downwardly along the outer wall more rapidly than in other portions of the vessel.

The conical taper is preferably not sharp enough to cause the glass actually to flow upwardly along the wall of the vessel when the glass is stirred at normal speeds, although this effect may be achieved, if desired, by stirring at relatively high speeds. It is presently thought that optimum results will be achieved when the speed of stirring is adjusted to the point where the downward velocity of the glass along the wall of the vessel is just equal to the speed of the glass at an intermediate point half-way between the wall and the major axis of the vessel.

In practice, the speed of stirring will usually be limited by the spacing between the tips of blades 26 of the stirrer and the wall of the vessel 16, and also by the occurrence of excessive turbulence and eddy current effects in the glass. These latter effects are variable in accordance with the particular glass composition being treated, and become significant only when stirring is done at relatively high speeds. The dimensional tolerances between the stirrer and the vessel is a result of design, and will ordinarily be set at smaller values where maximum homogenization and uniformity are required than in those cases where some compromise with the final quality of the glass may be made in order to achieve a higher production rate. When the tolerances are close, stirring speeds must be kept low to avoid distortion of the stirrer.

In general, taking the practical aspects into consideration, for glasses of most known most compositions and hydrodynamic properties, the taper of the vessel 16 should be between about 5° and 30°, in terms of the conical angle of the vessel, and the rate of stirring should be at least 20 r.p.m. but not more than about 150 r.p.m. These values are based on the assumption that the upper end of the vessel 16 is between about four inches and twelve inches in diameter, with a diameter of eight inches being about the optimum size for use in conjunction with most modern glass making equipment.

Heating devices 24 and 25 of any desired type are arranged around the vessel 16 and the ducts 20 and 22 for maintaining the glass at the desired temperature for delivery to the spout 14.

It is known that for optimum quality, motion of the glass should be minimized during its travel from the stirring vessel to its point of discharge. The glass should be kept as quiescent as possible. In the practice of the present invention this is accomplished by the change of direction of travel of the glass from vertical to horizontal immediately after it leaves the stirring vessel, which insures that the rotation imparted to the glass by the stirring paddle is lost very rapidly.

The slope of the inclined duct 22 also contributes to preserving the homogeniety of the glass after it leaves the stirring vessel. Because the duct 22 is inclined, the glass is protected from exposure to the atmosphere until just before it enters the spout 14. Preferential volatilization of ingredients of the glass, which tends to create striae is held to a low value. Also the duct 22 is preferably made of platinum, or other refractory, glass-insoluble metal so that contamination of the glass by contact with ceramic refractories is minimized.

According to the second feature of the invention, the blades 26 of the paddle 18 are hydrodynamically shaped to counteract the effect of the slow velocity of their root portions 28 relative to the velocity of their tip portions 30. This effect has previously been taken into account for various different purposes in the design of devices such as airplane propellors, but its importance in the art of stirring glass has not heretofore been appreciated.

Paddle blades of the type contemplated by the present invention are advantageous for use in all types of glass stirring apparatus, and when used in conjunction with the conically shaped stirring vessel of the invention, provide maximum stirring effectiveness.

As shown in FIGS. 3 and 4, the paddle blades 26 according to an exemplary embodiment of this feature are tapered in width and inclination, being widest and steepest at their roots 28, and narrowest and flattest at their tips 30. They are preferably also tapered in thickness, as shown, to provide maximum resistance to bending stresses near their roots where such stresses are greatest during operation.

In operation, the hydrodynamic design of the blades 26 compensates for the different linear velocities at which their different portions move through the glass. The portions near the roots 28 move relatively slowly, while the portions near the tips 30 move relatively fast. The root portions, however, being wider and more steeply inclined than the tip portions produce a stirring and flow retarding effect in the glass more nearly equal to the effect produced by the tip portions than possible with paddles of the prior art. The action produces a marked improvement in the homogeneity of the glass relative to glass stirred by prior art stirring devices. It insures substantially uniform stirring and mixing of the entire mass of glass passing through the stirring vessel, and effectively prevents the discharge of inadequately stirred glass from the central portion of the vessel.

There are many different ways to shape the paddle blades 26 to accomplish the desired results pointed out hereinabove. The practice of the invention is not limited to blades of the particular shape shown and described herein, but is intended to include all glass stirring paddle or turbine blades designed to compensate for the effect of the different linear speeds of the successive portions of the blades at different respective distances from the axis of rotation of the paddle or turbine.

What I claim is:

1. A paddle, or turbine for stirring glass comprising a shaft, plural blades axially spaced along and extending radially from said shaft, the outer tips of said blades lying along a line inclined relative to said shaft, said blades being outwardly tapered along substantially their entire length radially of said shaft to compensate for the variations in linear velocity of their different portions spaced at different respective distances from said shaft.

2. A paddle, or turbine for stirring glass comprising a shaft, plural blades axially spaced along and extending radially from said shaft, the outer tips of said blades lying along a line inclined relative to said shaft, said blades being outwardly tapered in width along substantially their entire length radially of said shaft to compensate for the variations in linear velocity of their different portions spaced at different respective distances from said shaft.

3. A paddle, or turbine for stirring glass comprising a shaft, plural blades axially spaced along and extending radially from said shaft, the outer tips of said blades lying along a line inclined relative to said shaft, said blades being outwardly tapered in inclination relative to their plane of rotation along substantially their entire length radially of said shaft to compensate for the variations in linear velocity of their different portions spaced at different respective distances from said shaft.

4. A paddle, or turbine for stirring glass comprising a shaft, plural blades axially spaced along and extending radially from said shaft, the outer tips of said blades lying along a line inclined relative to said shaft, said blades being outwardly tapered both in width and in inclination along substantially their entire length radially of said shaft to compensate for the variations in linear velocity of their different portions spaced at different respective distances from said shaft.

5. A paddle, or turbine for stirring glass comprising a shaft, plural blades axially spaced along and extending radially from said shaft, the outer tips of said blades lying along a line inclined relative to said shaft, said blades being outwardly tapered in width, thickness, and inclination along substantially their entire length radially of said shaft to compensate for the variations in linear velocity of their different portions spaced at different respective distances from said shaft.

6. A stirring device for homogenizing molten glass during its travel from a source to a discharge orifice device comprising a downwardly tapered vessel, flow directing means for receiving molten glass from a source thereof and causing the glass to flow downwardly through said vessel, means for stirring glass in said vessel, and means for stopping rotation of the glass after it leaves said vessel and before it reaches the orifice of the discharge device.

7. A stirring device for homogenizing molten glass during its travel from a source to a discharge orifice device comprising a downwardly tapered vessel, flow directing means for receiving molten glass from a source thereof and causing the glass to flow downwardly through said vessel, a paddle stirrer in said vessel for stirring glass therein and for causing the glass to flow radially outward toward the confining wall of said vessel, and means for stopping rotation of the glass after it leaves said vessel and before it reaches the orifice of the discharge device.

8. A forehearth for treating molten glass as it flows from a source to a discharge device comprising a downwardly tapered vessel, flow directing means for causing the glass to pass downwardly through said vessel in its travel through the forehearth, means for stirring the glass in said vessel with a horizontal, circular motion, and means for stopping rotation of the glass after it leaves said vessel and before it enters the discharge device.

9. A forehearth for treating molten glass as it flows from a source to a discharge device comprising a downwardly tapered vessel, flow directing means for causing the glass to pass downwardly through said vessel in its travel through the forehearth, a rotatable stirrer centrally positioned in said vessel for stirring the glass as it passes through said vessel, and means for stopping rotation of the glass after it leaves said vessel and before it enters the discharge device.

10. A forehearth for treating molten glass as it flows from a source to a discharge device comprising a downwardly tapered vessel, flow directing means for causing the glass to pass downwardly through said vessel in its travel through the forehearth, a paddle stirrer centrally positioned in said vessel, for stirring the glass as it passes through said vessel, the paddles of said stirrer being outwardly tapered along substantially their entire length to compensate for the variations in linear velocity of their different portions spaced at different respective distances from the center of said stirrer, and means for stopping rotation of the glass after it leaves said vessel and before it enters the discharge device.

References Cited by the Examiner

UNITED STATES PATENTS

| 734,687 | 7/1903 | Erter | 103—93 |
| 1,293,381 | 2/1919 | Dupuy | 259—133 |
| 1,450,326 | 4/1923 | Maitland | 259—7 |
| 1,778,775 | 10/1930 | Soubier | 65—178 |
| 2,569,459 | 10/1951 | De Voe | 65—178 |
| 3,057,175 | 10/1962 | Rough et al. | 65—178 |
| 3,178,099 | 4/1965 | Child | 230—122 |

FOREIGN PATENTS

| 957,563 | 8/1949 | France. |
| 216,133 | 2/1925 | Great Britain. |

WALTER A. SCHEEL, *Primary Examiner.*

CHARLES A. WILLMUTH, IRVING BUNEVICH,
*Examiners.*

ROBERT W. JENKINS, *Assistant Examiner.*